United States Patent [19]

Granlind et al.

[11] 4,424,872
[45] Jan. 10, 1984

[54] TRUCK

[76] Inventors: Ingmar Granlind, Skogshemsvägen 14, 146 00 Tullinge; Ove Bodin, Trädgardsgatan 12, 216 00 Fjugesta, both of Sweden

[21] Appl. No.: 314,510

[22] Filed: Oct. 23, 1981

[30] Foreign Application Priority Data

Oct. 23, 1980 [SE] Sweden ............................ 8007462
Sep. 29, 1981 [SE] Sweden ............................ 8105744

[51] Int. Cl.³ .................................. B62D 61/12
[52] U.S. Cl. ........................ 180/24.02; 180/209; 187/9 R; 280/43.17; 280/704; 414/631
[58] Field of Search ............... 180/24.02, 209; 280/47, 280/43.17, 704, 405 R; 414/631, 632, 673; 187/9 R; 91/216 R

[56] References Cited

U.S. PATENT DOCUMENTS

| | | | |
|---|---|---|---|
| 2,754,020 | 7/1956 | Dunn et al. | 414/632 |
| 3,191,963 | 6/1965 | Prichard | 280/405 R |
| 3,273,466 | 9/1966 | Balogh et al. | 91/216 R |
| 3,826,322 | 7/1974 | Williams | 180/209 |
| 4,174,854 | 11/1979 | Spicka et al. | 280/709 |

FOREIGN PATENT DOCUMENTS 316722 10/1969 Sweden ............................ 414/631
1508603 2/1967 United Kingdom ............. 187/9 R Primary Examiner—John A. Pekar
Assistant Examiner—D. Lynn Fugate
Attorney, Agent, or Firm—Burns, Doane, Swecker & Mathis

[57] ABSTRACT

A truck exhibiting lifting devices intended for the lifting of loads and pairs of wheels located at a certain distance from each other and adjacent to said lifting devices. At a point mid-way between the wheels making up the pair of wheels is support wheel so arranged as to absorb some of the compressive forces acting upon the pair of wheels. The support wheel is so arranged as to be forced against a base by a device consisting of a hydraulic piston and cylinder. The pressure inside the device is controlled by the pressure inside a load-lifting hydraulic piston and cylinder device.

The support wheel is pivotable or turnable in relation to the setting of the steering wheel.

10 Claims, 9 Drawing Figures

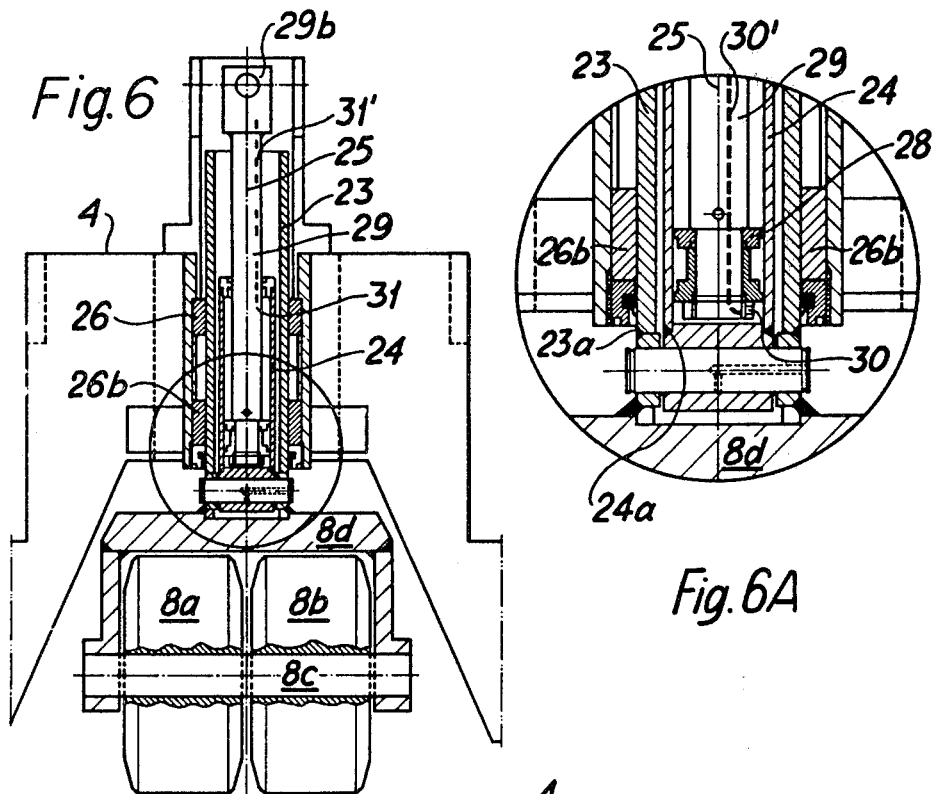
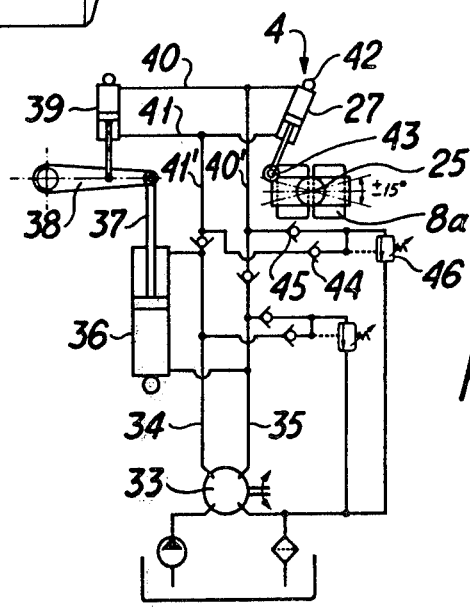

TRUCK

TECHNICAL FIELD

The present invention relates to a truck and in particular to a kind of fork-lift truck which exhibits lifting devices intended for the lifting of loads. Adjacent to the lifting devices are normally situated pairs of wheels located at a certain distance from each other intended to withstand a force corresponding to the weight of the load and that part of the service weight of the truck which is distributed onto said front pairs of wheels. Also present are pairs of wheels, usually steerable, by means of which the truck may be maneuvered.

It may, of course, be regarded as undesirable to designate the pairs of wheels as the front pair of wheels and the rear pair of wheels, since the truck must be capable of being driven in both directions, in spite of which the following specification will use the expression front pair of wheels in respect of the pair of wheels which will support the load and which are driven, whilst the expression rear pair of wheels will be used in respect of the pairs of wheels which will steer the truck. The principle of invention may also be applied to articulated fork-lift trucks.

DESCRIPTION OF THE PRIOR ART

Previously disclosed are a number of different fork-lift trucks which exhibit lifting devices intended for the lifting of loads, for example fork-trucks, said truck being equipped with front pairs of wheels intended for driving the truck and for supporting the load and rear pairs of wheels, the latter usually being steerable thereby enabling the truck to be maneuvered with and/or without a load.

In the case of fork-lift trucks of the nature referred to above the front pairs of wheels are dimensioned to support not only that part of the service weight of the truck which is distributed onto the front axle but also the load which can be lifted and transported by the lifting devices.

It is clear that the axle loading which is produced at full load and the corresponding compressive force exerted by the wheels on the base will be high. It is not unusual to have to reduce considerably the loading on the lifting devices at the maximum capacity of the truck due to the fact that the base on which the truck is being operated will not withstand the forces which are concentrated into the pairs of front wheels.

The torsional moment about the front axle must be selected such that the torsional moment due to gravity and to the position of the centre of gravity of the truck and the distance to the front axle is greater than the torsional moment due to gravity and to the position of the centre of gravity of the load and the distance to the front axle or, more correctly, the front support point of the truck.

Different arrangements have been suggested to increase the loading capacity of the truck. By the U.S. Pat. No. 2,754,020 it is suggested a free turnable wheel in front of endless track drive. By the Swedish Patent Specification No. 316 722 it is suggested a further supporting wheel adjacent the usually used wheels, in order to increase the bearing strength on soft soil or base.

DESCRIPTION OF THE PRESENT INVENTION

TECHNICAL PROBLEM

A particular technical problem exists with regard to trucks of the nature described above in being able to produce a truck of such a nature that the force exerted by the pairs of front wheels on the base at maximum load is less than the normally corresponding compressive force.

Accordingly, a specific technical problem exists in producing a device which is capable of absorbing a proportion, preferably an adjustable proportion, of the compressive forces acting on the pairs of front wheels.

It is irrational, because of the inability of the base to absorb the compressive forces resulting from the maximum load, to have to limit the weight of the load thereby only partially utilizing the capacity of the truck.

Thus the problem has been faced for a long time of distributing the compressive forces in such a way that the maximum load is able to rest on the lifting devices without in so doing exceeding the stipulated limit values in respect of the loading which may be applied to the base.

The aforementioned technical problem has proved particularly difficult to solve with regard to the loading and unloading of vessels where the trucks are required to pass over a base, in the form of cargo hatches, floorings and tank tops, etc., which are usually designed to withstand a certain level of stress and loading. These design levels are of a loading below that produced by a truck when fully laden.

A specific problem also exists with regard to creating the possibility of regulating the degree to which the loading may be removed from the pairs of front wheels, which means that none of the loading need be removed if the base will withstand the compressive forces which are being applied to it, but that the loading will be regulated in such a way that the actual loading limit values will not be exceeded in the case of a base which has been designed to withstand only a certain loading.

One other problem which has been faced for a long time is the possibility of increasing the load-carrying capacity of a truck without the need to increase the distance between the axles or to attach ballast weights to the rear of the truck.

It has been proven to be especially difficult to fullfil all the above mentioned desires and yet create the possibility to have the support wheel be controlled by the fact that the support wheel is turnable depending upon the turning angle of the steering wheel.

SOLUTION

The present invention relates to a truck of the nature described above, said truck having succeeded in solving the aforementioned problems.

For this purpose the invention proposes the installation between the pairs of front wheels of a support wheel designed so as to be capable of absorbing a proportion of the compressive forces normally acting on the pairs of front wheels.

The support wheel is also arranged so as to be capable of being forced down onto the base by a device consisting of a hydraulic piston and cylinder, and with the pressure in the device being controlled by the pressure supplied to a load-lifting hydraulic piston and cylinder device. This causes the direct transfer of the compressive force to the support wheel, said force increasing in proportion to the weight of the load.

The connection of an accumulator into the hydraulic system produces the advantage that the accumulator will absorb any momentary variations in pressure resulting from movements of the hydraulic piston in the support wheel cylinder, i.e. the support wheel will be caused to follow an uneven base at the same time maintaining the degree to which the compressive forces are removed from the wheels.

The invention also proposes the possibility of causing the support wheel to be free to pivot in relation to the position of a steering wheel, for which purpose the support wheel must be introduced into a holder which is not only free to pivot about a vertical shaft but is also capable of being raised and lowered along a horizontal shaft located at a certain distance.

The present invention also proposes a design in which the load-carrying capacity of the truck can be increased without the need for major design changes by positioning the support wheel between the front pair of wheels and the centre of gravity of the load thereby reducing the torsional moment generated by the load.

This arrangement enables the force on the front pair of wheels and its axle loading to be transferred to a different point on the base, this being a point closer to the centre of gravity of the load.

It is preferred to provide an automatic adjustment of the position of the support wheel (turning position) in relation to the position of the steering wheel (turning position).

ADVANTAGES

The advantages which may be regarded as being associated with a truck in accordance with the present invention are above all that the truck is able effectively to transfer and remove compressive forces on the front pair of wheels to a support wheel located between the front pair of wheels, and that the compressive force absorbed by the support wheel remains at an essentially constant value irrespective of any unevenness in the base. The support wheel has a vibration reducing effect when said truck is driven over an uneven base.

Furthermore, a truck designed for a certain load may be used for greater loads since the torsional moment produced by the load is less.

By turning the support wheel so it will run in the direction of movement for the truck, also by curves, conditions for a smooth and vibration free movement of heavy loads is created.

BRIEF DESCRIPTION OF THE DRAWINGS

A preferred embodiment exhibiting the characteristic features of the present invention will now be described in greater detail with reference to the attached drawing, in which:

FIG. 6 is a view of an alternative embodiment of the attachment of the support wheel;

FIG. 6A is an enlarged view of the portion of, FIG. 6 indicated by a circle;

FIG. 7 is a schematic view of a hydraulic circuit for the steering function.

DETAILED DESCRIPTION OF THE PREFERRED EMBODIMENT

Figure 1:
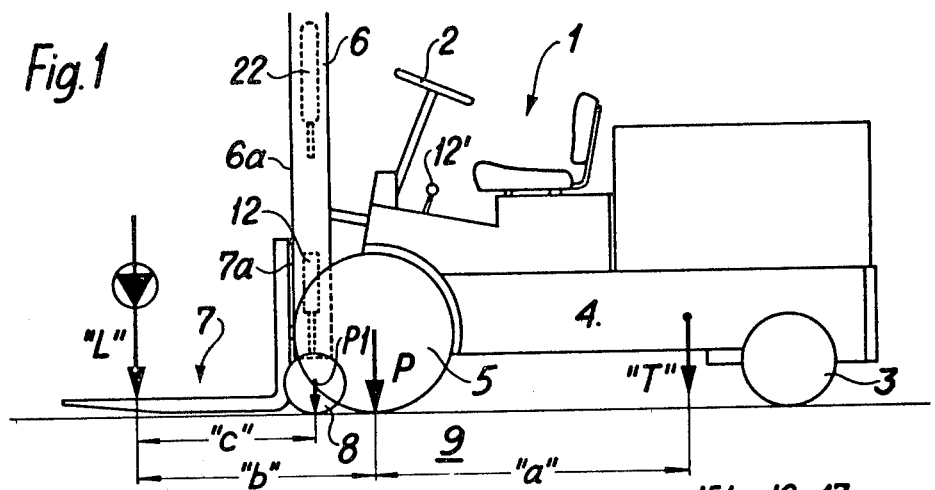
FIG. 1 is a side view of a truck equipped with a support wheel in accordance with the present invention in greatly simplified form.

FIG. 1 is a greatly simplified side view of a truck 1 fitted with a steering wheel 2 which, when turned, will cause rear wheels 3 to turn which are arranged in pairs and are attached to a frame assembly 4 of which the front part supports more heavily dimensioned pairs of front wheels 5 with a greater load-carrying capacity. The pairs of front wheels 5 are dimensioned so as to be capable of absorbing compressive forces corresponding to that part of the service weight of the truck which is distributed onto the pairs of front wheels and a maximum load 'L' placed on the lifting devices 7.

The front part of the truck 1 is fitted with vertically extending parallel masts 6 and 6', along which the lifting devices 7 are free to move. For this purpose the lifting devices 7 have on the one hand a sliding surface facing the mast and on the other hand an organ 7a which operates in conjunction with an organ inside the masts. Movement of the lifting device 7 along the mast 6 takes place with the help of a device not shown in FIG. 1 consisting of a hydraulic piston and cylinder operating in conjunction with the organ.

The pairs of front wheels 5 are at least two in number, of course, and are located at a certain distance from each other. It is not unusual, however, to have double pairs of front wheels, which means that the front wheels are four in number and are arranged in pairs located at a certain distance from each other. As far as the rear wheels 3 are concerned, these are normally located at a certain distance from each other and are two in number.

The present invention relates to the possibility of arranging a support wheel 8 between the pairs of front wheels 5. The support wheel has to be capable of absorbing a proportion of the compressive force P acting on the pair of front wheels 5, partly due to the load 7, and applied to the base 9. The support wheel 8 is located between the front wheels 5 and the load 'L'.

The load-carrying capacity of a truck is normally limited by the fact that the torsional moment $T \times a$ must be greater than the torsional moment of the maximum load $L \times b$, although the torsional moment $L \times b$ is reduced considerably by the present invention, at the same time as the axle loading is distributed to other points on the base.

Figure 2:
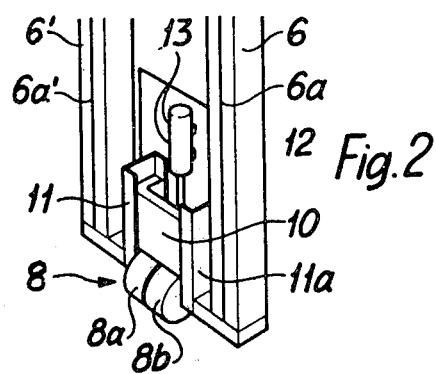
FIG. 2 is a perspective view of the arrangement of the support wheel, with the lifting devices of the truck removed for purposes of clarity.

The support wheel 8, which is shown in FIG. 2 to consist of two support wheels 8a and 8b located adjacent to each other and free to rotate about the same axle, is attached by a support wheel axle and a holder 8d to a plate 10, which is held in channels 11, 11a in such a way that the plate 10 may be caused to move up and down. This up and down movement is produced by a device 12 consisting of a hydraulic piston and cylinder with connections 13.

This arrangement makes it possible, via a distributor 12' positioned next to the driver, for hydraulic pressure to be applied to the cylinder device 12, thereby causing the plate 10 with its attached wheels 8 to be forced against the base 9 with a force P1, thereby causing the compressive force P from the pair of wheels 5 to be reduced to a corresponding degree.

The distributor 12' enables the compressive force 'P1' acting on the base 9 and generated by the hydraulic piston and cylinder device to be controlled.

It is important in this connection that the wheel 8 should be capable of being raised out of contact with the base 9, especially when the truck is turning, since any tight turn by the truck would cause the wheel 8 to move sideways, resulting in a high level of wear.

In order to eliminate this inconvenience, the present invention proposes an additional embodiment in which the wheel 8 is attached by means of a common axle 8c to a holder 8d in such a way that it is free to rotate. The holder 8d operates in conjunction with a piston-rod 12a, of which the piston 12b is mounted in a cylinder 12c. In this way, hydraulic pressure applied via the pipework 13 to the piston 12 will cause a compressive force P1 to be applied to the base 9.

The support wheel 8 may also be fitted with a control device which will respond to any deflection of the rear wheels 3 and 3'. The support wheel is angled in the horizontal plane to follow the steering geometry of the truck. Even when this device is fitted, it may be desirable to be able to control the piston 12b so that the wheel 8 is not forced against the base 9.

Figure 3:
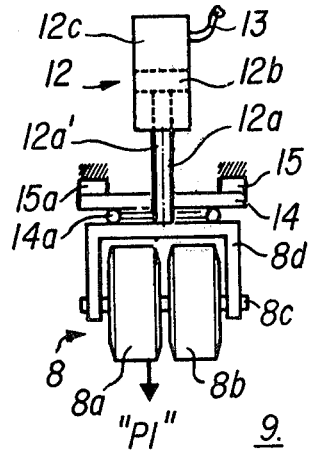
FIG. 3 is a front view of the attachment of the support wheel to the truck.
Figure 5:
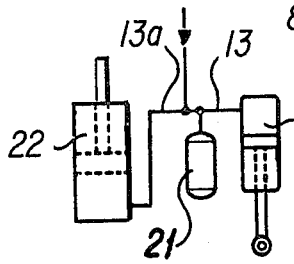
FIG. 5 is a schematic view of a hydraulic circuit including a device for accumulating hydraulic pressure.

An example of a conceivable control arrangement of this kind is illustrated in FIG. 3, in which a holder 8d is so arranged as to be free to pivot about a central axle 12a' for the piston-rod 12 located with a bearing device 14a between the holder 8d and a support 14. The support 14 operates in conjunction with parallel arms 15, 15a attached to the frame assembly or chassis 4 by a pivoting axle 15' and 15a' in such a way as to be free to pivot. In this way the wheel 8 can be caused to move up and down, as shown in FIG. 3, which means that the wheel will adapt to and follow any unevenness in the base 9.

Figure 4:
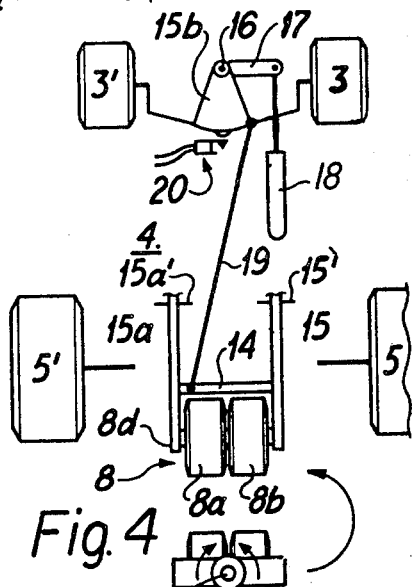
FIG. 4 is a view of a mechanical design in which the support wheel is to pivot in relation to the position of a steering wheel.

FIG. 4 shows the manner in which the pairs of front wheels 5 and 5' and the pairs of rear wheels 3 and 3' are located in relation to each other, and with the help of the steering wheel 2 a segment 15b is caused to rotate about a pivoting axle 16. This takes place through an arm 17 connected to a hydraulic piston and cylinder device 18. Rotation of the segment 15b will cause the pair of wheels 3 and 3' to turn, although the rotation is also linked via an arm 19 to the holder 8d for the wheel 8. With the help of the arm 19 the support wheel 8 will be caused to rotate about the axle 12a' in relation to the turning of the wheels 3, which means that the aforementioned wear will be eliminated. Even when this device is fitted, it may be desirable to be able to control the piston 12b so that the wheel 8 is not forced against the base 9.

A second embodiment has the wheel 8 operating via a piston device, so that the wheel 8 is able to follow any unevenness in the base causing a control arrangement to act on the piston-rod or to cause it to extend. Any deflection of the control arrangement will take place in relation to the deflection of the steering wheels and the steering geometry of the truck.

The reference designation 20 is used to indicate a micro-switch, which may be connected to the distributor or operating lever 12' in such a way that, when the pair of wheels 3, 3' turns, the effect of the hydraulic piston and cylinder arrangement will cease, and that, as soon as the pairs of wheels 3, 3' adopt the position shown in FIG. 4, the hydraulic piston and cylinder arrangement will cause the support wheel 8 to be forced against the base 9.

For the purpose of providing automatic balancing of the pressure inside the hydraulic piston and cylinder arrangement 12 the present invention proposes that the pipework 13 be connected to an accumulator 21. The pipework 13 operates via pipework 13a in conjunction with a cylinder 22 intended to raise and lower the lifting device 7. The cylinder 22 is positioned inside or between the masts 6, 6'.

It is recommended that the distributor 12' and the micros-switch 20 be connected in parallel, thus enabling either manual or automatic control of the movement of the piston 12b to be selected.

With reference to FIG. 6 and 6A it is shown an alternative embodiment of the attachment of the support wheel in the frame 4. Support wheels 8a, 8b are turnable about a shaft 8c, which is attached to a holder 8d. The upper central portion of the holder 8d cooperates partly with a guiding tube 23 (shown in sectional view) partly with a bottom portion 24a of a hydraulic cylinder 24. The bottom portion 23a of the guiding tube 23 and the bottom portion 24a of the hydraulic cylinder 24 are rigidly attached to the holder 8d.

The holder 8d may be turned around a central axis 25, which also is the central axis for the piston rod 29, by the fact that the tube 23 has a bearing at 26 for rotation and axial movement. The holder 8d may be turned by an hydraulic piston and cylinder arrangement 27 (FIG. 7).

The holder 8d may be raised or lowered (in the figures the holder 8d is shown in its uppermost position). This is caused by the fact that the bottom portion of the hydraulic cylinder 24 is attached to the holder 8d and the hydraulic piston 28 is fixed. The upper portion of the piston rod is fixed to the frame of the truck. Hydraulic pressure acting on the under surface of the piston 28 presses the hydraulic cylinder 24 downwards and a pressure acting on the upper surface of the piston 28 presses the hydraulic cylinder upwards. Ducts 30' and 31' having orifices 30 and 31 are arranged within the piston rod and terminate at not shown connection portions in the upper portion 29b of the rod 29. The fixed attachment of the upper portion 29b for the piston rod 29 is not shown.

Referring to FIG. 7 a hydraulic circuit for the steering function is illustrated. One previously known control valve 33 is arranged for controlling the hydraulic pressure and the flow through the conduits 34 and 35 to a hydraulic piston and cylinder device 36, where the piston rod 37 actuates one steering arm 38 included in the steering mechanism and attached to the steering wheels. The arm 38 cooperates with a first hydraulic piston and cylinder device 39, which via conduits 40, 41 is connected to a second hydraulic piston and cylinder device 27. The devices 39 and 27 may preferably be identical.

The hydraulic piston and cylinder devide 27 is connected at 42 to the frame 4 of the truck and at 43 to the edge portion of the holder 8d, for causing a turning motion of the support wheels 8a, 8b around the axis 25.

A displacement of the piston in the device 39 causes a corresponding displacement of the piston in the device 27, thus causing a turning of the support wheels in dependence of the setting of the steerable rear wheel 2.

In order to ensure that the support wheels 8a, 8b follow exactly the setting and turning of the rear wheel 2 it is arranged that a leakage will cause the support wheels into a terminal position before the rear wheel comes into its terminal position. In such a case the terminal position of the support wheels will cause a rise in the pressure, which is transferred through the conduits 40', 41' via a check valves (nonreturn valves) 44, 45 to a overflow or over pressure valve 46, which causes, when the rear wheel 2 is moved from its terminal position, that the support wheels 8 follow the turning. The overflow valve is intended to cause a specific position (terminal position) for said support wheel 8 when the steering wheel 2 is brought into a specific position (terminal position).

Figure 8:
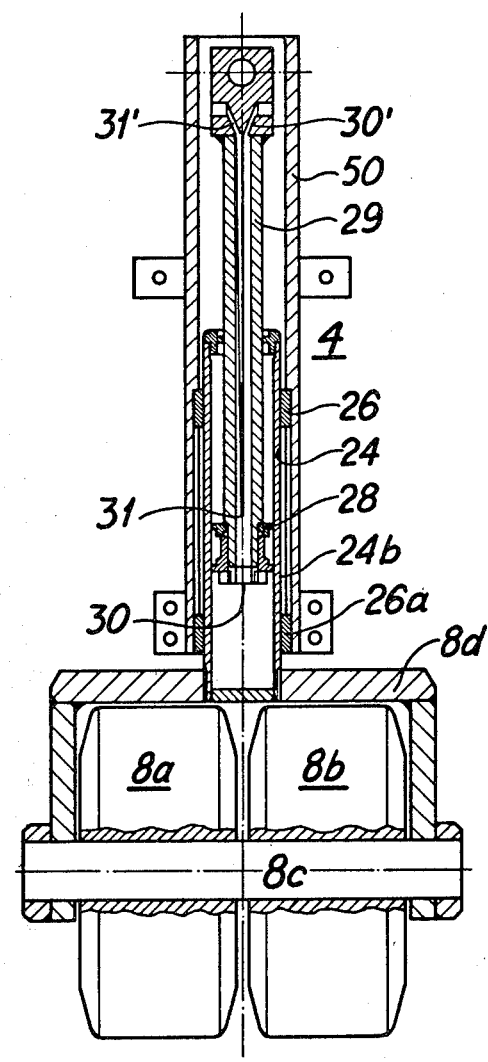
FIG. 8 is a view of a further alternative embodiment of the attachment of the support wheel.

Referring to FIG. 8 it is shown a further embodiment of the device according to FIG. 6. In this embodiment the guiding tube 23 is eliminated because the outer surface 24b of the cylinder 24 has a slip fit to the bearing devices 26, 26a, which are attached to the frame 4. It is suggested that a tubular device 50, fixed to the frame 4, shall support the bearing device 26, 26a. The remaining parts in FIG. 8 have been given the same reference numerals as in the embodiment according to FIG. 6. The connecting conduits 30' and 31' have been shown.

The present invention is not, of course, restricted to the preferred embodiment indicated above by way of an example, but may undergo modifications within the scope of the following Patent Claims.

We claim:

1. A truck, comprising lifting devices for the lifting of loads, at least one pair of wheels located at a distance from each other and adjacent to said lifting devices, at least one support wheel located between the pair of wheels, said support wheel being arranged to absorb a proportion of the compressive forces due to the weight of the load acting upon the pair of wheels, urging means for selectively forcing said support wheel against a base, said urging means including an hydraulic piston and cylinder, the pressure in said urging means being controlled by the pressure inside a load-lifting hydraulic piston and cylinder device, an axle for the support wheel being arranged at a predetermined distance ahead of an axle for the pair of wheels, the support wheel being arranged to absorb a proportion of axle load due to the weight of the load acting upon the pair of wheels, the support wheel being free to pivot about a vertical axis coincident with a piston rod of the urging means, means cooperating with the support wheel for causing a turning of said support wheel about the vertical axis in relation to the position of steerable wheels of the truck.

2. The truck according to claim 1, wherein said support wheel is pivotable about the vertical axis directly in relation to the turning of the steerable wheels.

3. The truck according to claim 1, wherein the support wheel is arranged in a holder which is pivotable about the vertical axis and is adapted to be raised and lowered.

4. The truck according to claim 1, further comprising an accumulator connected to the urging means for absorbing variations in pressure attributable to the movement of the support wheel resulting from unevenness in the base.

5. The truck according to claim 1, wherein said piston rod is fixed at an upper portion and the cylinder of the urging means is movable along the piston rod for causing the support wheel to be raised and/or lowered, hydraulic fluid being connected to spaces at each side of the piston via conduits in the piston rod.

6. The truck according to claim 5, wherein a tube surrounds the cylinder of the urging means, said tube being guided for axial displacement and rotation in a frame of the truck.

7. The truck according to claim 1, wherein a steering device of the steerable wheels is connected to a first hydraulic piston and cylinder device, said first hydraulic piston and cylinder being connected via conduits to a second hydraulic piston and cylinder device, the second hydraulic piston and cylinder being connected between a frame of the truck and a holder of the support wheel, an over flow valve being arranged to ensure a terminal postion for said support wheel before the steerable wheels are brought into a terminal position.

8. The truck according to claim 1, wherein the pressure in the hydraulic piston and cylinder connected to the support wheel is directly connected to the load-lifting hydraulic piston and cylinder device.

9. A truck, comprising lifting devices for the lifting of loads, at least one pair of wheels located at a distance from each other and adjacent to said lifting devices, at least one support wheel located between the pair of wheels, said support wheel being arranged to absorb a proportion of the compressive forces due to the weight of the load acting upon the pair of wheels, urging means for selectively forcing said support wheel against a base, said urging means including an hydraulic piston and cylinder, the pressure in said urging means being controlled by the pressure inside a load-lifting hydraulic piston and cylinder device, an axle for the support wheel being arranged at a predetermined distance ahead of an axle for the pair of wheels, the support wheel being arranged to absorb a proportion of axle load due to the weight of the load acting upon the pair of wheels, the support wheel being free to pivot about a vertical axis coincident with a piston rod of the urging means, and said hydraulic piston and cylinder of the urging means being connected or disconnected in dependence on a setting of a distributor.

10. The truck according to claim 9, further comprising means for controlling the urging means such that the hydraulic piston and cylinder device is disconnected upon a large turning of steerable wheels of the truck.

* * * * *